United States Patent [19]
Fortsch

[11] 3,949,457
[45] Apr. 13, 1976

[54] MEANS AND METHOD FOR BRANCHING WIRE BUNDLES

[76] Inventor: William A. Fortsch, 28 West Lawn Ave., Livingston, N.J. 07039

[22] Filed: Mar. 20, 1975

[21] Appl. No.: 560,382

[52] U.S. Cl. .......... 29/203 MW; 29/624; 174/72 A; 317/122
[51] Int. Cl.² ........................................ H01R 43/00
[58] Field of Search .. 29/624, 203 M, 203 B, 203 J, 29/203 P; 317/122; 174/72 A, 72 R, 40 CC; 248/68 R, 73, 74 B, 74 PB, 74 A, 223, 224, 225, 316 D, 505; 269/296, 310, 311, 321 A, 321 WE; 339/103 R, 103 M

[56] References Cited
UNITED STATES PATENTS

| | | | |
|---|---|---|---|
| 3,087,984 | 4/1963 | Waranch | 317/122 X |
| 3,260,793 | 7/1966 | Edelman | 317/122 X |
| 3,861,015 | 1/1975 | Hooven | 317/122 X |

FOREIGN PATENTS OR APPLICATIONS

| | | | |
|---|---|---|---|
| 1,490,592 | 7/1969 | Germany | 174/72 A |

OTHER PUBLICATIONS
IBM Tech. Discl. Bull., "Cable Harness Clamp," F. W. Hill, Vol. 2, No. 1, June 1959, p. 3.
Panduit Corp., "Plastic Snap Cover Wiring Duct," Mar. 1961.

*Primary Examiner*—C. W. Lanham
*Assistant Examiner*—James R. Duzan
*Attorney, Agent, or Firm*—David Teschner; Jesse Woldman

[57] ABSTRACT

A flexible branching strip for a wire bundle comprises a pair of preferably flat elongate interlocking members selectively spaced from one another and joined together at discrete intervals by flexible web portions. One of the members contains a series of open wire receiving slots interposed between respective tongue portions which are interlockingly engageable within a series of transverse openings in the other member. Selected wires of a wire bundle may be branched out of the bundle and disposed within respective wire receiving slots, and the strip curled about the branched bundle so that the members may be interlocked to one another with the web portions operating as spaced bundle ties about the unbranched portion of the wire bundle. The branching strip may be temporarily supported in a slotted strip support attachable to a wiring board for convenient orientation of the wire receiving slots during the branching operation. Also disclosed is a tool having a preformed bifurcated first end arranged to effect sequential closure of the strip by being selectively drawn across the overlapping members.

12 Claims, 16 Drawing Figures

MEANS AND METHOD FOR BRANCHING WIRE BUNDLES

BACKGROUND OF THE INVENTION

1. Field of the Invention

The invention is directed to the field of cabling devices and principally to a branching means and method for wire bundles.

2. Description of the Prior Art

Prior art branching or break-out devices for wire bundles are variously disclosed in the following patents: U.S. Pat. No. 505,798 issued to O. A. Bell on Sept. 26, 1893; U.S. Pat. No. 667,195 issued to T. V. Davis on Feb. 5, 1901; U.S. Pat. No. 2,219,887 issued to H. W. Bowley et al. on Oct. 29, 1940; U.S. Pat. No. 3,080,892 issued to W. A. Plummer on Mar. 12, 1963; U.S. Pat. No. 3,082,984 issued to B. G. Larsson et al. on Mar. 26, 1963; U.S. Pat. No. 3,455,336 issued to R. H. Ellis on July 5, 1969; and U.S. Pat. No. 3,459,878 issued to T. J. Gressitt et al. on Aug. 5, 1969. The majority of the disclosures show a common design incorporating either a slotted or apertured sleeve, the apertures or slots of which are provided to receive the branched wires which have been separated from the main wire bundle or cable. Closure of the sleeve is generally accomplished by a relatively cumbersome interlocking seam or zipper-like arrangement which, when employed in combination with the disclosed fully enclosed sleeves, results in relatively expensive, bulky, and loose fitting structure of limited versatility and application. With the advent of advanced technology in solid state communication and central devices, much present day wiring and cabling incorporates a multitude of relatively small diameter wires which must be branched or broken away from the main cable run for subsequent connection to terminals, connectors, and like elements. The prior art devices such as exemplified in the above noted patents fail to provide the versatility, economy of manufacture, and ease of use required in such applications, and in many other applications in which convenience, cost, and versatility are important considerations.

SUMMARY OF THE INVENTION

The invention overcomes the limitations and difficulties noted above with respect to such prior art devices by providing an integral branching and retaining strip for wire bundles or the like which is more versatile, convenient, and less expensive than such prior art devices. The strip may be readily manufactured from electrically insulating plastic material by well known techniques including molding, stamping, and extruding, or the like, and comprises a pair of spaced elongate members flexibly interconnected to one another by web portions or struts which function as retaining bundle straps upon the closure of the device about a branched bundle. One of the elongate members comprises a series of tongue portions spaced from one another by wire receiving slots arranged to coincide and interlock with a corresponding series of selectively contoured openings in the other elongate member. Disclosed are various configurations of the tongue portions and the corresponding openings to provide interlocking engagement therebetween. The web portions may be structured to provide either a fixed or variable length for accommodating wire bundles of varying sizes. In use, the strip is placed about a given length of the wire bundle in the area to be branched, and selective wires of the bundle separated therefrom and placed within the wire receiving slots of the respective member of the strip. After all wires to be branched are disposed within the slots which are arranged to provide a given fixed spacing therebetween, the apertured member of the strip is brought around the remaining wires of the bundle so that the openings thereof coincide with respective tongue portions of the other member. The two members are then urged together to cause the tongue portions to enter and engage the opposing openings to provide a closure of each of the wire receiving slots and of the strip about the branched wire bundle, the web portions thereby circumferentially encircling the bundle and retaining the unbranched wires therewithin. To facilitate the branching operation in conjunction with a wiring board, there is also disclosed a reusable strip support which may be attached to the wiring board at suitable locations to provide a temporary holder for the branching strip during the wiring operation. The strip support comprises an elongate block having a strip receiving channel extending lengthwise preferably along one side of the support, and transverse slots or recesses arranged to coincide with the wire receiving slots of the strip. The support is adapted to receive the tongue portion bearing member of the strip within the channel in such manner as to maintain such member preferably in a verticle orientation with respect to the plane of the wiring board, with the wire receiving slots of the associated strip member coincident with the transverse slots in the support. The wires which are branched out of the wire bundle may then be brought through the wire receiving slots of the strip and through the transverse slots in the support in a desired spaced array prior to closure of the strip as described heretofore. Thus, a plurality of such branching strips may be prewired during the cabling operation and subsequently closed about the contained wires in any desired order. A branching system may further include a tool-like device having a bifurcated and arranged to apply selective pressure to the overlying strip members to sequentially interlock the mating tongue portions and openings. It is therefor an object of this invention to provide an improved cabling means and method.

It is another object of this invention to provide a means and method for selectively branching a wire bundle or the like.

It is a further object of this invention to provide a means for restraining the branched wires of a wire bundle.

It is still another object of this invention to provide a means for simultaneously restraining the branched and unbranched portions of a wire bundle.

It is yet another object of this invention to provide an inexpensive branching strip for a wire bundle or the like.

It is still a further object of this invention to provide a system for selectively branching a wire bundle or the like.

It is yet a further oject of this invention to provide a system for selectively branching a wire bundle or the like for use in conjunction with a wiring surface.

It is still another object of this invention to provide an integral device for locating, guiding, and restraining the branched wires of a wire bundle.

It is yet another object of this invention to provide an improved means for maintaining the branched wires of a wire bundle in fixed relationship with the remaining portion of the wire bundle.

It is still a further object of this invention to provide an improved wire branching system having a reusable branching strip support.

It is yet a further object of the invention to provide an improved method for selectively branching a wire bundle.

Other objects and features will be pointed out in the following description and claims and illustrated in the accompanying drawings which disclose, by way of example, the principle of the invention and the best mode contemplated for carrying it out.

BRIEF DESCRIPTION OF THE DRAWINGS

In the Drawings.

Similar elements are given similar reference characters in each of the respective drawings.

Figure 1:
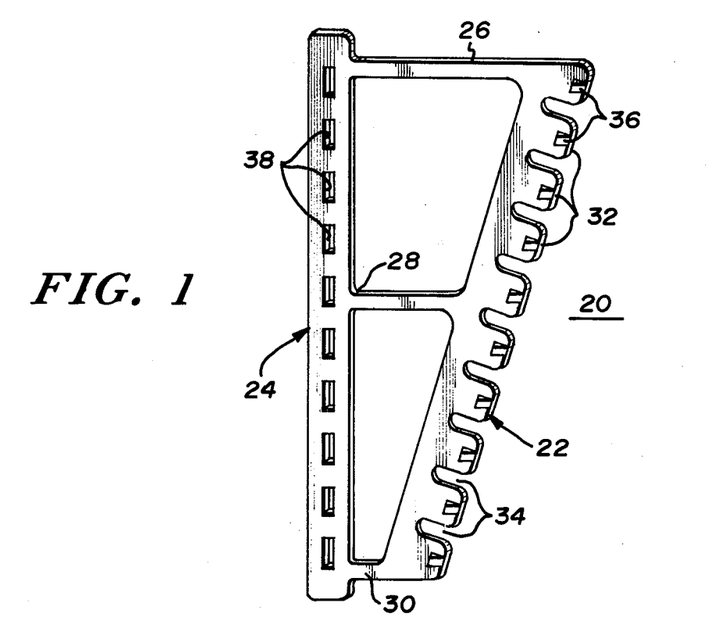
FIG. 1 is a perspective view of a branching strip constructed in accordance with the concepts of the invention.
Figure 2:
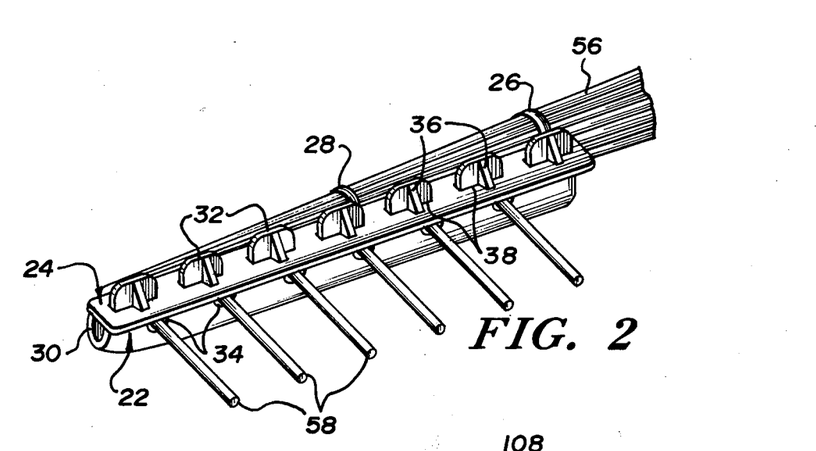
FIG. 2 is a perspective view of a portion of a branched wire bundle employing the device of FIG. 1.
Figure 5:
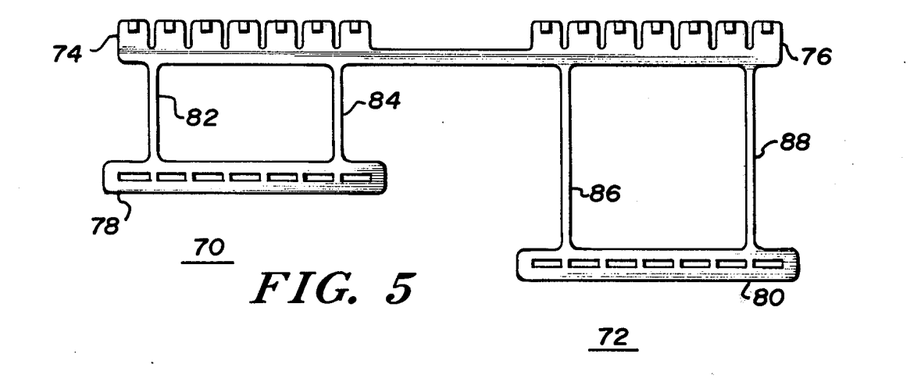
FIG. 5 is a top plan view of a further embodiment of a branching strip constructed in accordance with the concepts of the invention.
Figure 6:
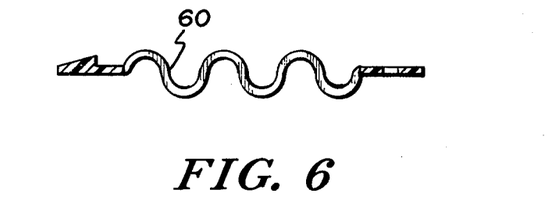
FIG. 6 is a side elevational view, partly in section, of a further embodiment of the web portion of a branching strip constructed in accordance with the concepts of the invention.
Figures 7, 8, 9:
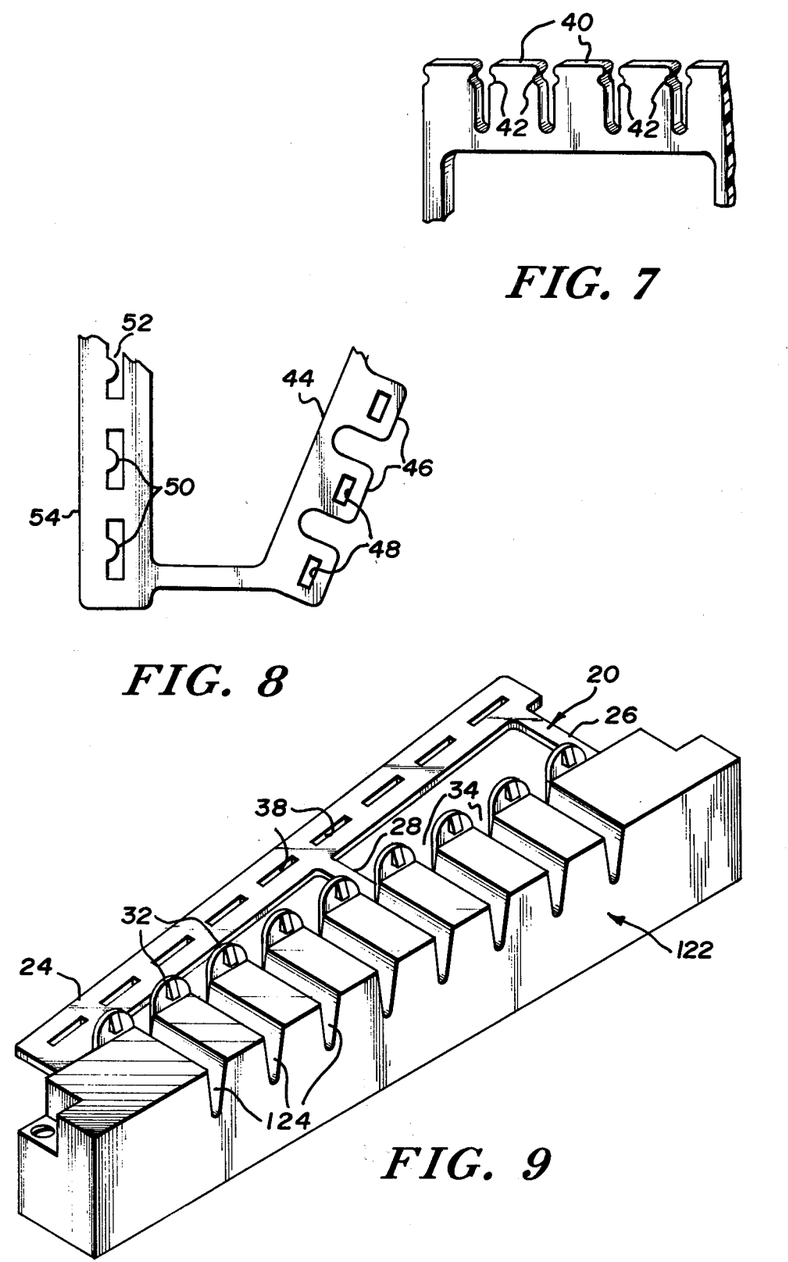
FIG. 7 is a fragmentary perspective view, partly in section, of a further embodiment of the tongue portions of a branching strip constructed in accordance with the concepts of the invention.
FIG. 8 is a fragmentary top plan view of a further embodiment of the interlocking structure of a branching strip constructed in accordance with the concepts of the invention.
FIG. 9 is a perspective view of a branching strip and strip support constructed in accordance with the concepts of the invention.
Figure 14:
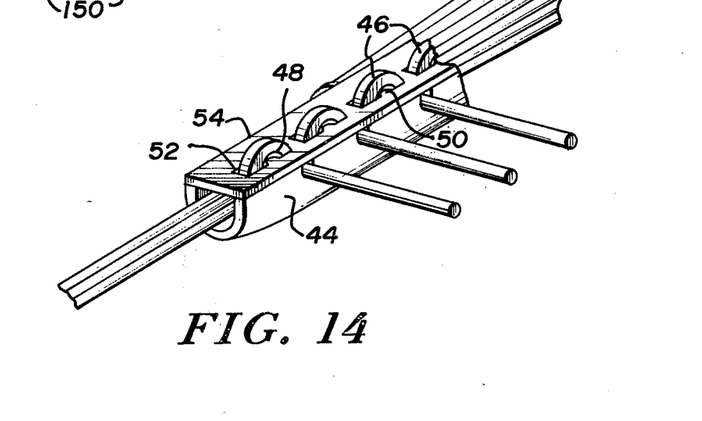
FIG. 14 is a fragmentary perspective view of the embodiment of FIG. 8 as assembled about a branched wire bundle.
Figure 16:
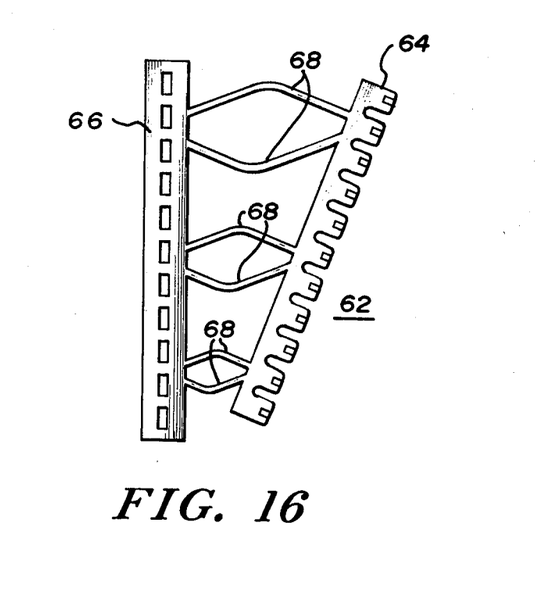
FIG. 16 is a top plan view of still another embodiment of a branching strip constructed in accordance with the concepts of the invention.

DESCRIPTION OF THE PREFERRED EMBODIMENTS:

Turning now to FIGS. 1 and 2 there is shown a branching strip 20 constructed in accordance with the concpets of the invention and comprising a first elongate member 22, a second elongate member 24, and flexible web portions 26, 28, and 30 interconnecting members 22 and 24. For economy and convenience of manufacture, the strip 20 may be readily molded or stamped from preferably an electrically insulating plastic material such as nylon, polyethelene, polypropylene, or other like flexible plastic materials well known in the art. The first member 22 comprises a series of spaced tongue portions 32 extending along the outer edge thereof and disposed generally normal to the longitudinal axis of the member 22. The tongue portions 32 are separated from one another by open wire receiving slots 34. In the particular embodiment illustrated in FIGS. 1 and 2, each of the tongue portions 32 is provided with a wedged shaped locking tab 36 located generally adjacent its free end. The second member 24 comprises a series of openings 38, one for each of the tongue portions 32, and selectively located along a common axis so as to coincide with and receive the respective tongue portion 32 upon closure of the strip 20. In the embodiment illustrated in FIGS. 1 and 2, the openings 38 are proportioned to have a width and length generally equivalent to the cross section of the tongue portions less the protruding area described by the locking tabs 36. Consequently, since the strip 20 is formed preferably of a resilient, readily deformable material, the tongue portions 32 including the tabs 36 may be forced through the openings 38 until the tab 36 clears the respective opening in the insertion direction, said tabs 36 thereafter engaging the area adjacent the openings 38 to prevent removal of the respective tongue portions 32 and interlocking the tongue portions 32 within the openings 38. An alternative arrangement for interlocking the branching strip members may include a configuration such as shown in FIG. 7 in which a series of partially illustrated tongue portions 40 each comprise a necked-in segment 42 generally adjacent the free and thereof. The openings in the corresponding second member (not shown) are dimensioned to have a reduced length generally equivalent to the width of the tongue portions 40 in the area of the necked-in segments 42 so that each of the tongue portions 40 may be forced through a respective opening in the second member and retained therein by the interlocking engagement between the free end of the tongue portion and the surface bounding the respective opening. A further interlocking arrangement is shown in FIGS. 8 and 14 wherein a first member 44 comprises a series of tongue portions 46 each having a transverse slot 48 extending therethrough, and arranged to interlockingly receive a protuberance 50 extending into an opening 52 in a second member 54, the openings 52 corresponding generally to the openings 38 of strip 20 as shown in FIGS. 1 and 2. Thus, as the tongue portion 46 is progressively inserted within the opening 52, the protuberance 50 is caused to be deflected slightly until it coincides with the slot 48, and returns to its undeflected position, thereby engaging the slot 48 and preventing removal of the tongue portion 46 from the opening 52, substantially as shown in FIG. 14. Returning now to FIG. 2 the strip 20 is shown in a closed position about a bundle of wires 56 in which a selective group of wires 58 has been branched therefrom. The wires 58 are each seated in a respective wire receiving slot 34 in spaced intervals governed by the spacing between the slots 34 which are enclosed by the overlying second member 24. The web portions 26 and 28 encircle the unbranched portion of the wire bundle 56 such as a bundle tie to provide a secure, compact assembly threat. Each of the web portions 26, 28, and 30, although shown in the embodiment illustrated in FIGS. 1 and 2 as having a discrete fixed axial length and providing thereby a fixed given loop diameter when the strip 20 is closed, may be modified in any one of a number of alternate configurations to provide a variable axial length. One such alternative arrangement is shown in FIG. 6 wherein a web portion 60 is structured to have an undulating or wavy configuration to permit a given amount of expansion thereof in the direction of its longitudinal axis to at least partially compensate for varying wire bundle diameters. It should be understood that any one or more of the web portions of the strip 20 may be modified in such manner for this purpose. Furthermore, the undulating configuration may be planarly oriented either parallel or normal to the plane of the branching strip, as desired, with generally equal effectiveness, the embodiment illustrated in FIG. 6 showing, however, a normally oriented configuration. A further embodiment of variable length web portions is shown in FIG. 16 wherein a strip 62 comprises a first member 64 and a second member 66, interconnected by a series of bowed flexible web portions 68, each capable of being deformed in the longitudinal direction to increase the axial length thereof to accommodate a particular range of wire bundle diameters. The oblique angular relationship between the first and second members 22 and 24, respectively, of the branching strip 20 is designed to more closely approach a conical configuration in the closed state to conform generally with the associated configuration of a wire bundle from which a plurality of wires have been separated and branched therefrom. However, in cases where the original diameter of the wire bundle is but minimally changed by the branching of a group of wires therefrom, as, for example, where the bundle contains a relatively large amount of wires and only relatively few wires have been branched therefrom intermediate the ends of the wire bundle, a branching strip configuration similar to that illustrated in FIG. 5 may be effectively employed. For the sake of illustration, there is shown a pair of branching strips 70 and 72, each having a respective first member 74, 76, extending generally parallel to a respective second member 78, 80, which is flexibly joined thereto by interconnecting web portions 82, 84, 86, and 88, respectively. Each of the strips 70 and 72 thus defines an essentially cylindrical configuration in the closed state, to more closely conform to the bundle configuration in applications such as described immediately above. A similar result may be obtained, however, by employing substantially the same embodiment illustrated in FIGS. 1 and 2, but substituting variable length web portions for the fixed length web portion 28 and 30 so that the first and second members 22 and 24 of strip 20 may be reoriented in generally parallel relationship to one another by exerting an opposing force on such members in the area generally adjacent the zone of maximum convergence. Returning now to FIG. 5, each of the branching strips 70 and 72 may be used individually to enclose individual branched wire bundle segments of differing diameters, or may be employed in series to enclose successive branched lengths of a continuous wire bundle.

Figure 3:
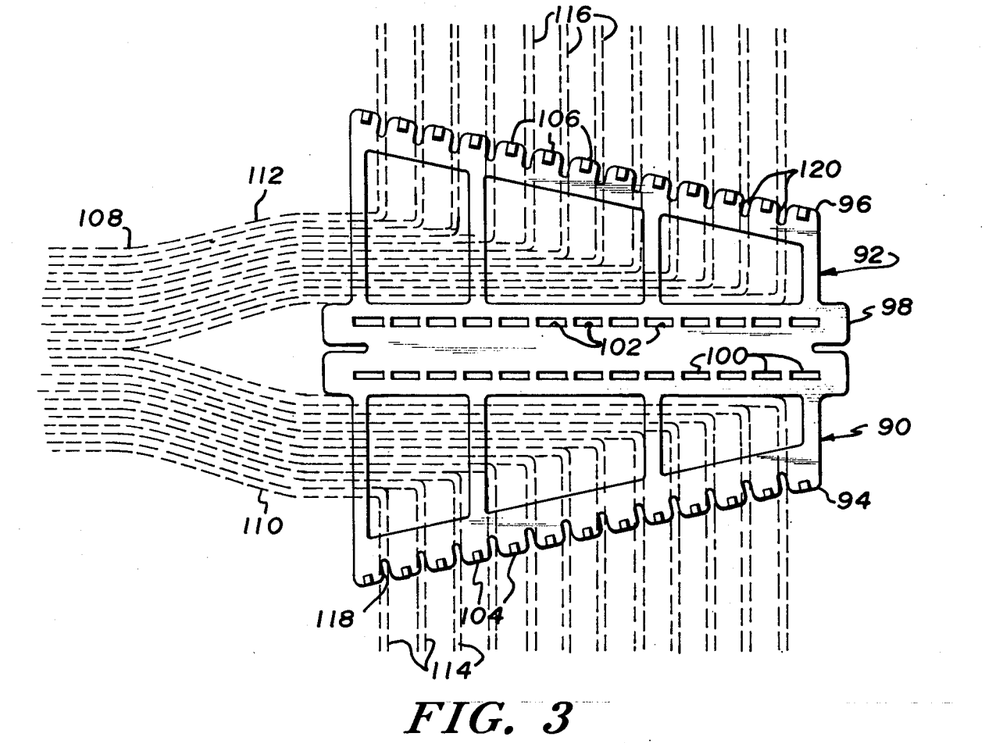
FIG. 3 is a top plan view of a further embodiment of a branching strip constructed in accordance with the concepts of the invention.
Figure 4:
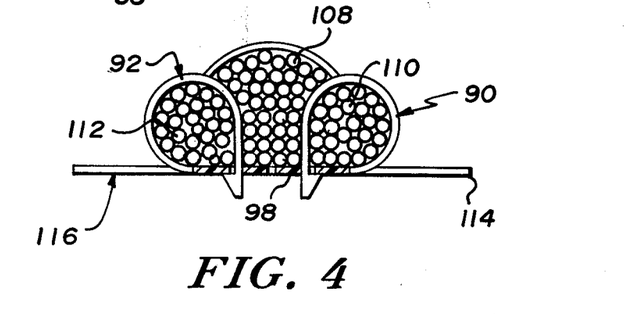
FIG. 4 is a side elevational view, partly in section, of the device of FIG. 3 assembled about a branched wire bundle.

Turning now to FIGS. 3 and 4 there is shown a further embodiment integrally formed of juxtaposed branching strips 90 and 92 constructed in accordance with the concepts of the invention wherein each of the strips 90 and 92 is essentially a minor image of the other and each is essentially duplicative of strip 20 illustrated in FIGS. 1 and 2. The strips 90 and 92 each comprise a first member 94, 96, respectively, but share a common second member 98 which is provided with two series of longitudinal extending openings 100 and 102 disposed generally parallel to one another. The openings 100 are adapted to lockingly receive a corresponding series of tongue portions 104 located along the outer edge of the first member 94, and the openings 102 are similarly adapted to lockingly receive a series of tongue portions 106 located along the opposing outer edge of the first member 96. This arrangement may thus be effectively employed to divide a wire bundle shown in dotted outline as 108 into two main branches 110 and 112 from which respective groups of wires 114 and 116, respectively, are to be branched in opposite directions. In FIG. 3 the wires 114 are shown deployed within respective wire receiving slots 118 of the first member 94, while wires 116 are shown deployed within respective wire receiving slots 120 of second member 96. It will be noted that less than all of the slots 118 are shown occupied by wires 114, since any given applications may necessitate a variable spacing between adjacent branched wires of a particular group, which may be readily accomplished in the manner shown in FIG. 3. The completed branch assembly is shown in FIG. 4 whereby the primary wire bundle branches 110 and 112 are enclosed in respective strips 90 and 92 with the branched groups of wires 114 and 116 extending normal thereto and restrained within the respective wire receiving slots 118 and 120.

Figure 10:
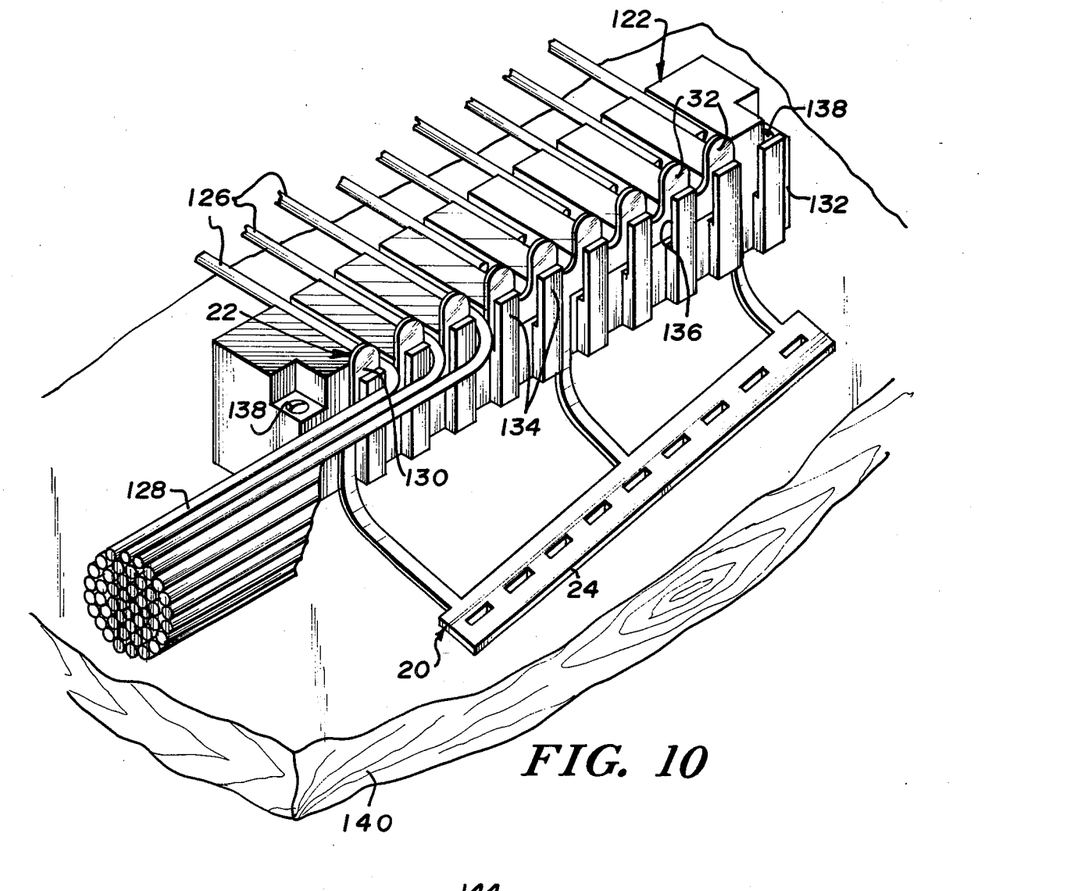
FIG. 10 is a rear perspective view of the combination of FIG. 9 illustrating its use in conjunction with a wiring board.
Figure 11:
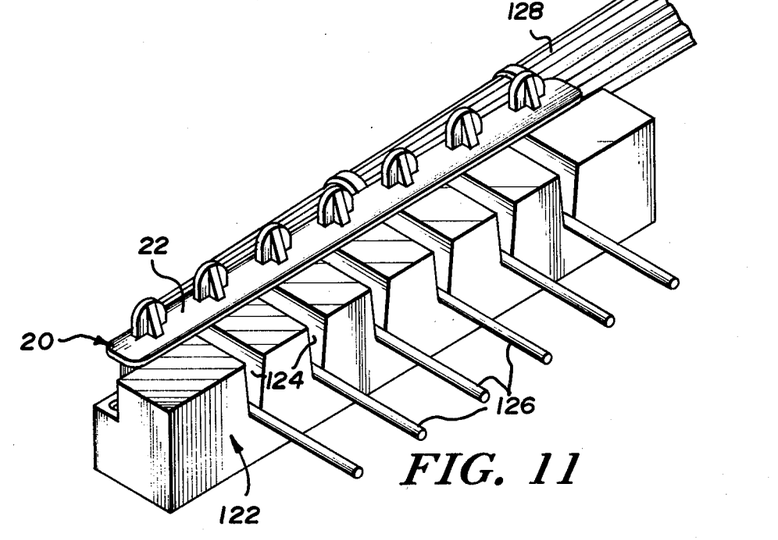
FIG. 11 is a perspective view of the combination of FIG. 9 in which the branching strip has been closed about a branched wire bundle.
Figure 12:
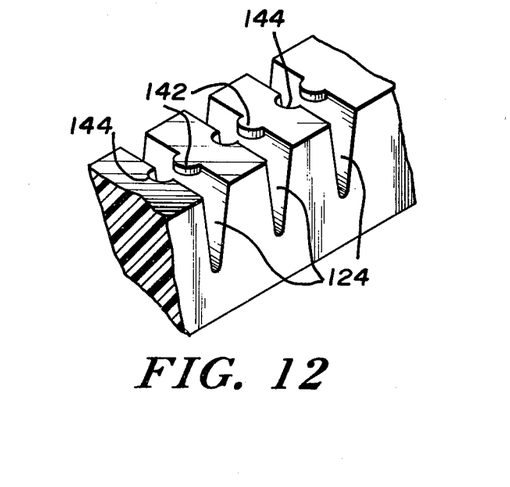
FIG. 12 is a fragmentary perspective view, partly in section, of a further embodiment of a strip support constructed in accordance with the concepts of the invention.
Figure 13:
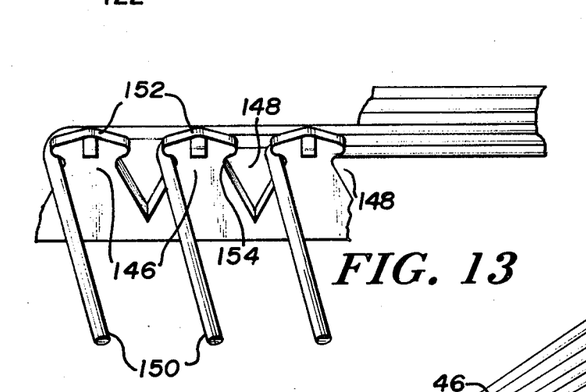
FIG. 13 is a fragmentary perspective view, partly in section, of another embodiment of the tongue portions of a branching strip constructed in accordance with the concepts of the invention.

Referring now to FIGS. 9, 10 and 11, there is shown a strip support 122 constructed in accordance with the concepts of the invention. The support 122 may be readily formed from any convenient material, such as plastic, metal, or wood and may comprise, by way of illustration, a generally elongate configuration of rectangular or square cross section. The strip support 122 is provided wth a series of transverse slots 124 extending across the top surface thereof and arranged to coincide with the wire receiving slots 34 of the branching strip 20 and to provide a guide and support for the wires 126 branched out of a wire bundle 128 during the branching operation. To facilitate the support of the strip 20, the strip support 122 further includes a channel portion 130 (FIG. 10) extending longitudinally along an upstanding side 132, adjacent the transverse slots 124 and communicating therewith. The width of the channel portion 130 is arranged to closely approximate the thickness of the first member 22 of the strip 20 so that the first member 22 may be placed within and supported by the channel portion 30 essentially in the manner shown in FIG. 10 during the branching operation. The second member 24 of strip 20 is thus permitted to extend freely behind the support 122. In the particular embodiment illustrated in FIGS. 9, 10, and 11, the channel portion 130 of the support 122 is partially defined by a series of aligned finger portions 134 formed preferably integral with the support 122 and having an inner surface 136 spaced from the side 132 so as to define the width of the channel portion 130. Each of the finger portions 134 is preferably formed so as to be resiliently deflectable so that the width of the channel portion defined by the series of inner surfaces 136 of the finger portions 134 may be restricted somewhat to define an opening slightly narrower than the thickness of the first member 22. Accordingly, the user may thus force the first member 22 of the strip 20 into the channel portion 130 against the restraining frictional force of the finger portions 134 which will then bear against the first member 22 to temporarily hold it in the desired position during the branching operation. The strip 20 may, however, be readily removed therefrom upon completion of the branching operation simply by grasping the strip 20 in any convenient location and urging it upward and out of the channel portion 130. It will of course be readily apparent to those skilled in the art that various other restraining arrangements including mating tabs and recesses (not shown) selectively located respectively on the first member 22 and the support 122 may be similarly employed to temporarily maintain the strip 20 within the channel portion 130 of the support 122. As further illustrated in FIG. 10, the support 122 may be provided with mounting means such as through holes (not visible) located adjacent either end thereof and arranged to receive a fastening means such as a screw 138 for attaching the support 122 to a wiring board such as 140. To further insure that the branched wires 126 remain in place in the transverse slots 124 of the support 122 during the branching operation, where necessary or desirable each of the slots 124 may be provided with overhanging tab portions 142, as shown in FIG. 12. The tab portions 142 may be selectively structured and coupled to the body of the strip support 122 in such manner as to be either deflectable or non-deflectable, as necessary or desirable. Either effect may be readily obtained, for example, by varying either the cross section of the tab or its coupling to the support 122. Complementarily formed recesses such as 144 located opposite the tab portions 142 on the opposing side of the slots 124 may also be provided to permit more convenient insertion of the branched wires into the respective slots 124. In use, the tab portions 142 provide a slight restriction adjacent the open end of the associated slots 124 requiring the user to temporarily deform the branched wire somewhat to traverse the tab portion 142 and place the wire within the slot 124. The tab portion 142 will then tend to impede movement of the wire upwardly and out of the slot 124 during the branching operation. The recesses 144 located opposite the corresponding tab portions 142 provide a relieved area thereat to facilitate the insertion of a given wire into the corresponding slot 124. The tongue portions 32 of the branching strip 22 may be modified for a similar purpose in the manner shown, for example, in FIG. 13 wherein each tongue portion 146 is separated from a neighboring tongue portion 146 by a generally V-shaped wire receiving slot 148 to provide a variable opening thereat. Due to the inclined configuration of the side walls of the slots 148, wires such as 150 which are inserted therewithin may tend to ride up the side wall and out of the slot 148. To prevent this condition, each of the tongue portions is provided with an enlarged free end, as at 152, communicating with a corresponding slot 148 to provide a wire engaging recess 154 at the point of communication. The wire 150 is thus effectively captured in the recess 154 and prevented from further upward travel until purposely released therefrom.

Figure 15:
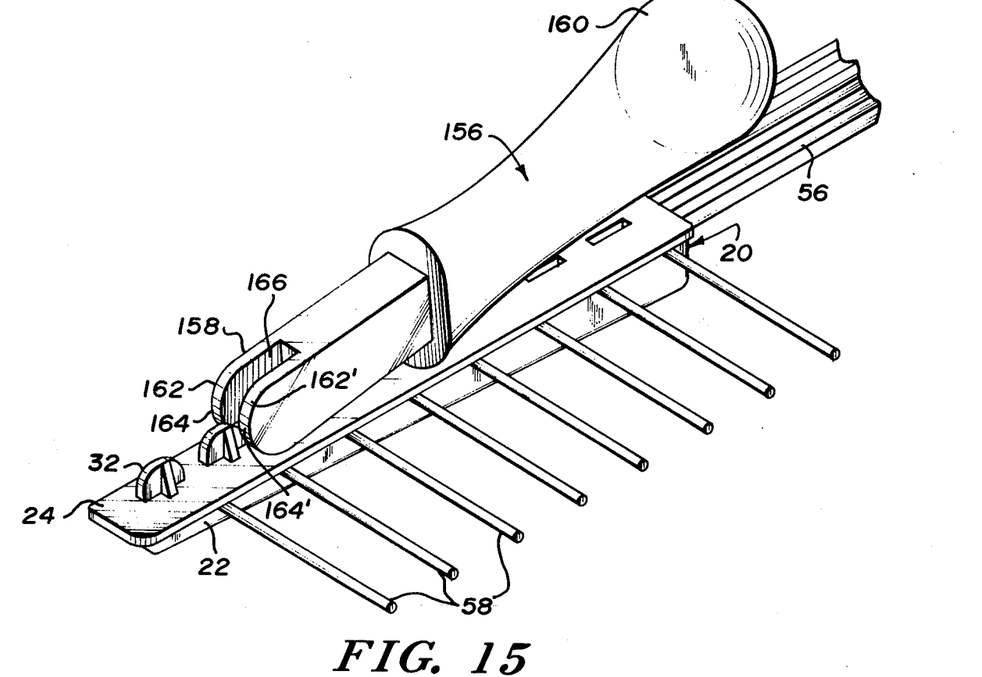
FIG. 15 is a perspective view showing the device of FIG. 1 in combination with a closure tool constructed in accordance with the concepts of the invention.

Turning now to FIG. 15 there is shown a manually operable closure tool 156 constructed in accordance with the concepts of the invention for use with a branching strip such as 20. The tool 156 comprises a first end 158 coupled to a handle portion 160 arranged to be held by the user for the purpose to be described below. As shown in FIG. 15, the first end 158 is bifurcated to provide a pair of spaced leg portions 162, 162' preferably of symmetrical contour for convenience of use. Each of the leg portions 162, 162' is preferably smoothly arcuately formed at its terminating end, as at 164, 164', respectively, to reduce the friction thereat when the tool 156 is drawn along the surface of the branching strip 20. As further shown in FIG. 15, the leg portions 162 and 162' are spaced apart a distance slightly less than the width of the second member 24 of the branching strip 20 and define an interior opening 166 therebetween arranged to straddle the free ends of the tongue portions 32 of the first member 22. Thus, to effect sequential closure of the strip 20 upon completion of the branching operation, the openings 38 in the second member 24 are first brought into coincidence with the corresponding tongue portions 32 of the first member 22, substantially as shown. The bifurcated and 158 of the tool 156 is then brought into contact with the second member 24 of the strip 20 such that the leg portions 162 and 162' are oriented in a direction coinciding generally with the longitudinal axis of the second member 24. Pressure is then applied through the leg portions to the second member 24 to force the openings 38 over the respective tongue portions 32 as the tool 156 is progressively moved from one end of the second member 24 to the other. Where necessary, the tool 156 may be reciprocally moved back and forth over the second member 24 to insure that each tongue portion 32 is fully interlocked with a corresponding opening 38. The tool 156 thus provides a means for interlocking the first and second members of the branching strip in a simple, rapid, and convenient operation.

Although there has been illustrated and described various embodiments of the invention, it should be understood that such embodiments are intended to be merely illustrative of the preferred embodiments and that other arrangements and modifications will be readily apparent to those skilled in the art without departing from the spirit of the invention and within the concepts herein disclosed.

The embodiments of the invention in which an exclusive property or privilege is claimed are defined as follows:

1. Apparatus for selectively branching and enclosing individual wires of a wire bundle comprising, in combination: a deformable strip comprising a first elongate member having a series of discrete spaced tongue portions along one edge, said tongue portions being spaced from one another by wire receiving slots, a second elongate member having a series of openings, one for each of said tongue portions and arranged to coincide and interlock with a respective one of said tongue portions, and flexible web portions interconnecting said first and said second members to one another to permit a wire bundle to be engaged within the elongate loop formed by deforming said strip about a wire bundle and interlocking said second member to said first member;

and a reusable strip support adapted to be attached to a wiring board, said strip support comprising an elongate member having a series of spaced transverse slots extending across the width thereof and arranged to provide a guide for wires branched out of a wire bundle, said strip support further comprising a channel portion extending along one longitudinal side thereof for releasably receiving said first member therein to temporarily locate and hold said strip in a convenient portion during the wire branching operation, said strip support transverse slots being spaced so as to coincide with said wire receiving slots located between said tongue portions of said strip first member.

2. Apparatus as defined in claim 1 wherein said strip support further includes a series of tab portions, one for each of said transverse slots, each of said tab portions extending partially into and overlying a respective transverse slot to provide a partial restraint for a branched wire disposed therewithin.

3. Apparatus as defined in claim 1 wherein said strip support is formed as a unitary elongate block of electrically insulating plastic material.

4. Apparatus as defined in claim 1 wherein each of said strip support transverse slots communicates at one end with said strip support channel portion.

5. Apparatus as defined in claim 1 wherein said strip support channel portion comprises a series of spaced finger portions arranged to engage respective ones of said tongue portions.

6. Apparatus as defined in claim 1 wherein said strip support further includes apertured mounting pads for attaching said strip support to a wiring board.

7. Means for selectively branching and enclosing individual wires of a wire bundle comprising: a first elongate member; a second elongate member; and flexible web portions selectively interconnecting said first member to said second member so that said second member may be brought into overlying relationship with said first members, said first member, said second member, and said web portions all lying in a common plane, said means being formed as an integral structure of homogeneous electrically insulating material; said first member comprising a series of spaced tongue portions extending generally normal to the longitudinal axis of said first member along the length thereof and lying within said common plane, there being a wire receiving slot intermediate each two adjacent tongue portions; said second member having a series of discrete spaced openings, one for each of said first member tongue portions, said openings extending substantially along a common axis generally coincident with the longitudinal axis of said second member, said second member openings each being aligned in transverse coincidence with and arranged to interlock with a respective one of said first member tongue portions, each of said tongue portions comprising tab means protruding therefrom for interlocking engagement with a respective one of said second member openings wherein, upon placement of a wire bundle intermediate said first and said second members, individual wires of such bundle may be selectively branched out of the bundle and disposed within a respective wire receiving slot and thereafter retained in place by folding said second member over said first member and interlocking said respective tongue portions within said openings.

8. Mean as defined in claim 1 wherein the longitudinal axes of said first and said second members are disposed at an oblique angle to one another within said common plane, the transverse spacing between a given one of said first member tongue portions and a mating one of said second member openings being directly proportional to their distance from one end of said means.

9. Means as defined in claim 1 wherein the longitudinal axes of said first and said second members extend generally parallel to one another.

10. Means as defined in claim 7 wherein each of said second member openings has a protuberance extending thereinto to restrict the width of the opening thereat, and each of said tongue portions has a transverse slot arranged to coincide with a respective one of said protuberances to provide interlocking engagement therebetween.

11. Means as defined in claim 7 wherein each of said web portions has a fixed axial length.

12. Means as defined in claim 7 wherein each of said web portions has a generally undulating configuration to provide a variable axial length.

* * * * *

UNITED STATES PATENT AND TRADEMARK OFFICE
CERTIFICATE OF CORRECTION

PATENT NO. : 3,949,457
DATED : April 13, 1976
INVENTOR(S) : William A. Fortsch

It is certified that error appears in the above-identified patent and that said Letters Patent are hereby corrected as shown below:

Column 2, line 40, "and" should be -- end --

Column 4, line 46, "and" should be -- end --

Column 5, line 10, "threat" should be -- thereat --

Column 8, line 27, "and" should be -- end --

Signed and Sealed this

Third Day of August 1976

[SEAL]

Attest:

RUTH C. MASON
Attesting Officer

C. MARSHALL DANN
Commissioner of Patents and Trademarks